United States Patent
Choi et al.

(10) Patent No.: US 12,238,445 B2
(45) Date of Patent: Feb. 25, 2025

(54) APPARATUS AND METHODS FOR PROVIDING PRECISE MOTION ESTIMATION LEARNING MODEL

(71) Applicant: RESEARCH & BUSINESS FOUNDATION SUNGKYUNKWAN UNIVERSITY, Suwon-si (KR)

(72) Inventors: Won Je Choi, Suwon-si (KR); Sung Hyun Choi, Suwon-si (KR); Hong Uk Woo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 413 days.

(21) Appl. No.: 17/899,112

(22) Filed: Aug. 30, 2022

(65) Prior Publication Data

US 2023/0122516 A1   Apr. 20, 2023

(30) Foreign Application Priority Data

Sep. 3, 2021   (KR) .................. 10-2021-0117636

(51) Int. Cl.
*H04N 5/14* (2006.01)
*G06T 13/40* (2011.01)

(52) U.S. Cl.
CPC ............. *H04N 5/145* (2013.01); *G06T 13/40* (2013.01)

(58) Field of Classification Search
None
See application file for complete search history.

(56) References Cited

U.S. PATENT DOCUMENTS

| 8,199,152 B2 * | 6/2012 | Sullivan .................. G06T 13/20 345/473 |
| 8,941,665 B1 * | 1/2015 | Sullivan .................. G06T 13/40 345/473 |
| 11,645,798 B1 * | 5/2023 | Demyanov .......... G06V 40/176 345/474 |

(Continued)

OTHER PUBLICATIONS

Siarohin A, Lathuilière S, Tulyakov S, Ricci E, Sebe N. Animating arbitrary objects via deep motion transfer. InProceedings of the IEEE/CVF Conference on Computer Vision and Pattern Recognition 2019 (pp. 2377-2386). (Year: 2019).*

(Continued)

*Primary Examiner* — Michelle M Entezari Hausmann
(74) *Attorney, Agent, or Firm* — NSIP Law

(57) ABSTRACT

The present disclosure is an apparatus and a method for providing a precise motion estimation learning model including, a database unit which stores a standard dataset labeled according to a first number of key points, an animation dataset labeled according to a second number of key points which is larger than the first number, and a photorealistic dataset having the second number of key points, a standard learning unit which learns the standard dataset for motion estimation to generate a standard learning model, an animation learning unit which retrains the animation dataset based on a weight of the standard learning model to generate an animation learning model, and a motion estimation learning unit which trains the photorealistic dataset based on the weight of the animation learning model to finely tune to generate a precise motion estimation learning model.

10 Claims, 9 Drawing Sheets

(56) References Cited

U.S. PATENT DOCUMENTS

2008/0170777 A1* 7/2008 Sullivan .................. G06T 7/33
345/475

OTHER PUBLICATIONS

Yoon, J. S., Liu, L., Golyanik, V., Sarkar, K., Park, H. S., & Theobalt, C. (2021). Pose-guided human animation from a single image in the wild. In Proceedings of the IEEE/CVF Conference on Computer Vision and Pattern Recognition (pp. 15039-15048). (Year: 2021).*

Siarohin A, Woodford OJ, Ren J, Chai M, Tulyakov S. Motion representations for articulated animation. InProceedings of the IEEE/CVF Conference on Computer Vision and Pattern Recognition 2021 (pp. 13653-13662). (Year: 2021).*

Ekmen B, Ekenel HK. From 2D to 3D real-time expression transfer for facial animation. Multimedia Tools and Applications. May 2019;78(9):12519-35. (Year: 2019).*

Feng Y, Feng H, Black MJ, Bolkart T. Learning an animatable detailed 3D face model from in-the-wild images. ACM Transactions on Graphics (ToG). Jul. 19, 2021;40(4):1-3. (Year: 2021).*

Lin, Kevin, et al. "Cross-Domain Complementary Learning Using Pose for Multi-Person Part Segmentation." IEEE Transactions on Circuits and Systems for Video Technology 31.3, arXiv:1907.05193v2 [cs.CV] May 14, 2020: 1066-1078.

Chen, Shuhong, and Matthias Zwicker. "Transfer Learning for Pose Estimation of Illustrated Characters." Proceedings of the IEEE/CVF winter conference on applications of computer vision. arXiv:2108.01819v1 [cs.CV] Aug. 4, 2021, (12 pages).

* cited by examiner

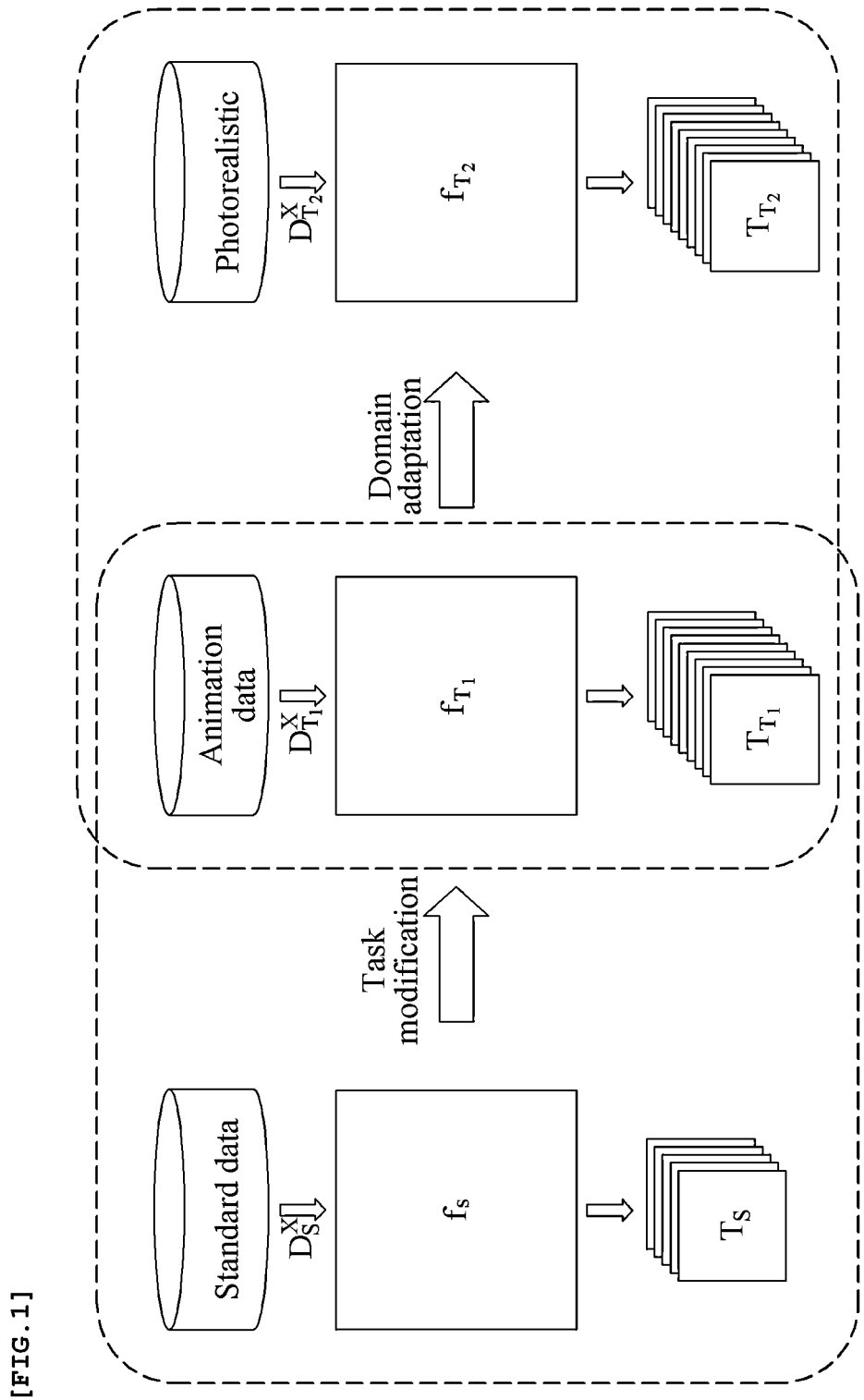
[FIG.1]

[FIG.2]
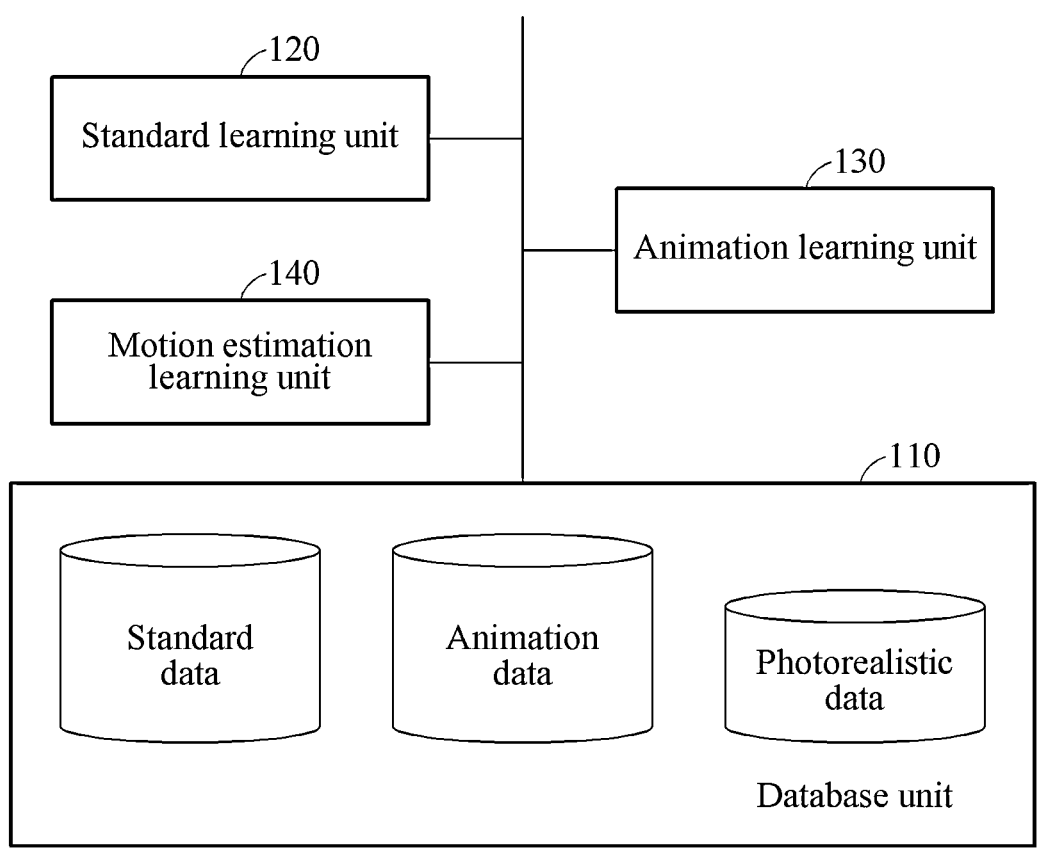

[FIG.3]
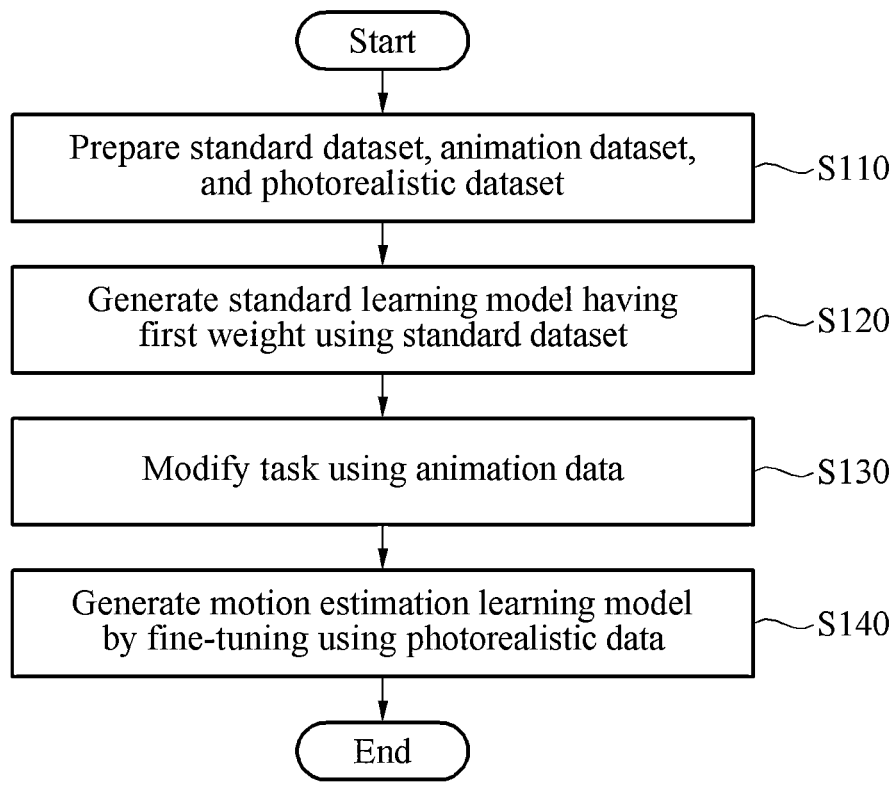

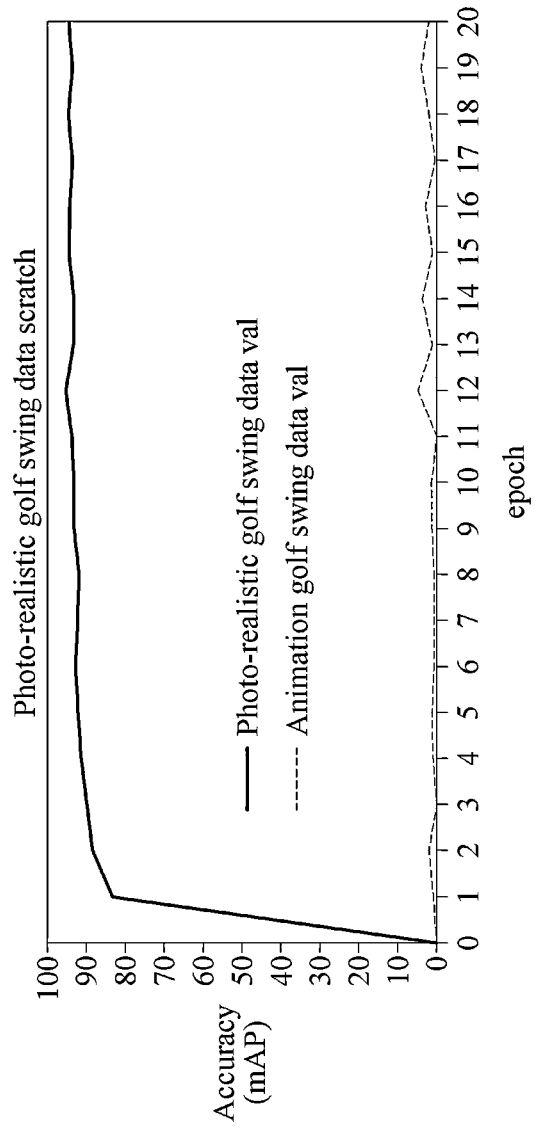
[FIG. 4A]

[FIG. 4B]
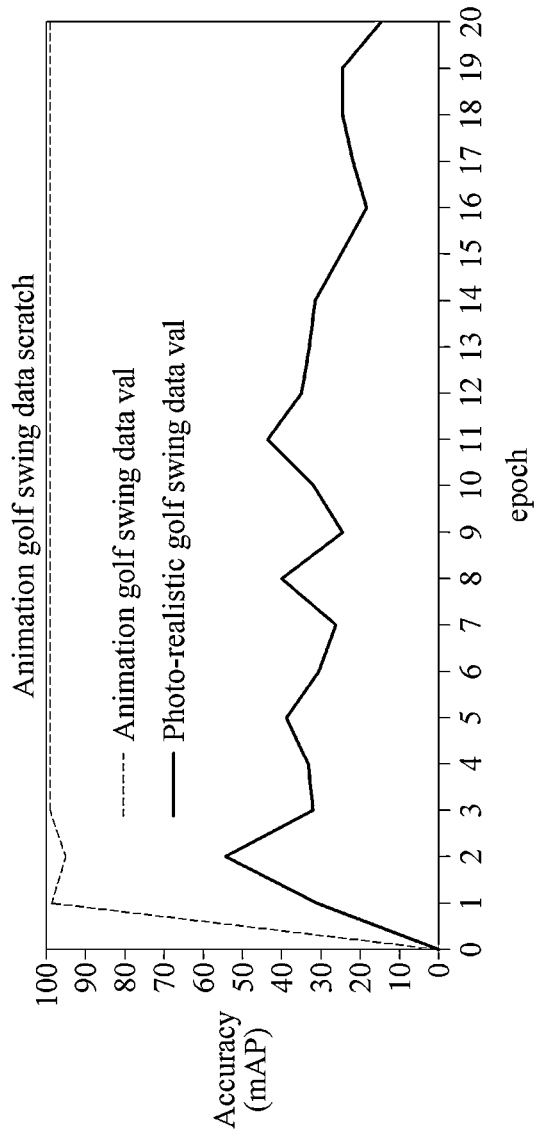

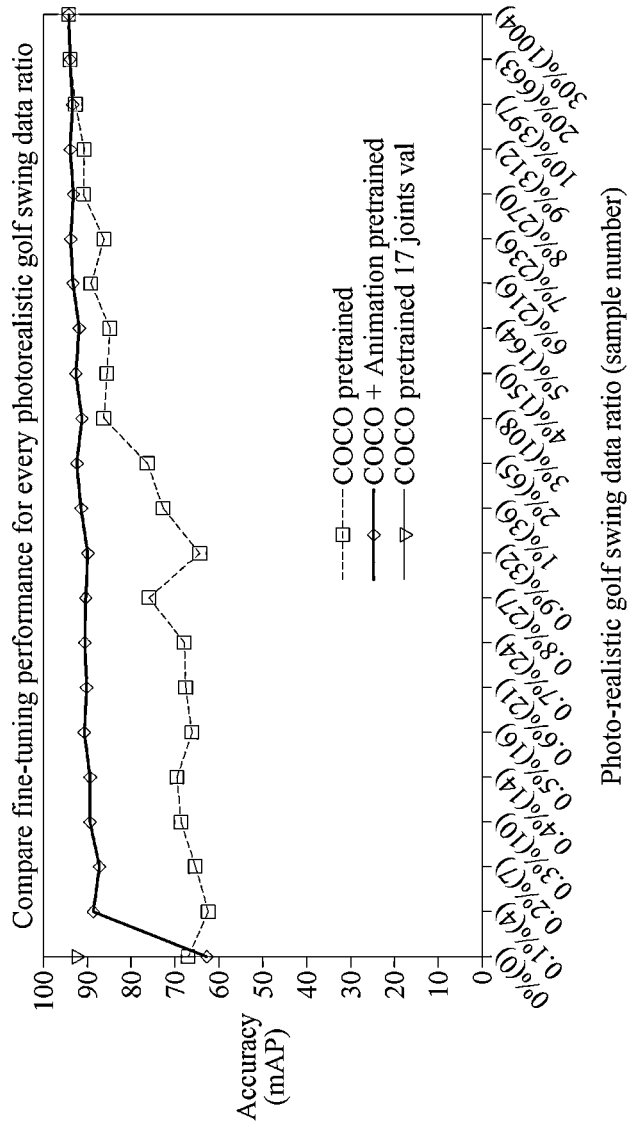
[FIG. 5]

[FIG.6A]
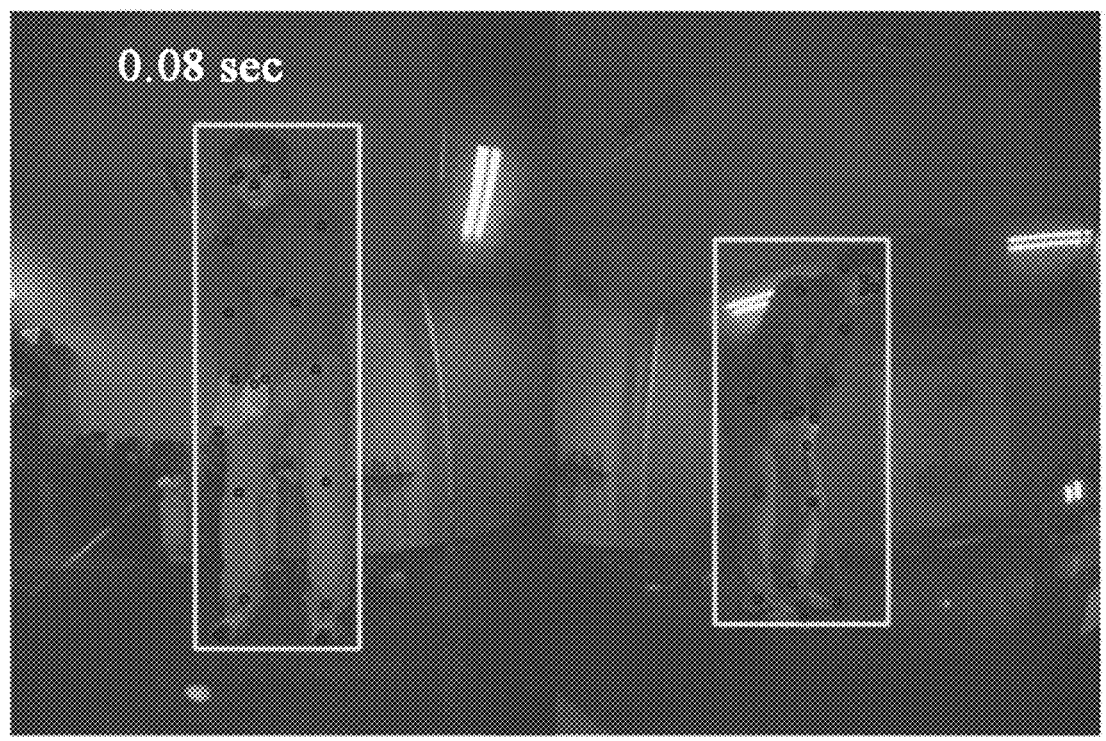

[FIG.6B]
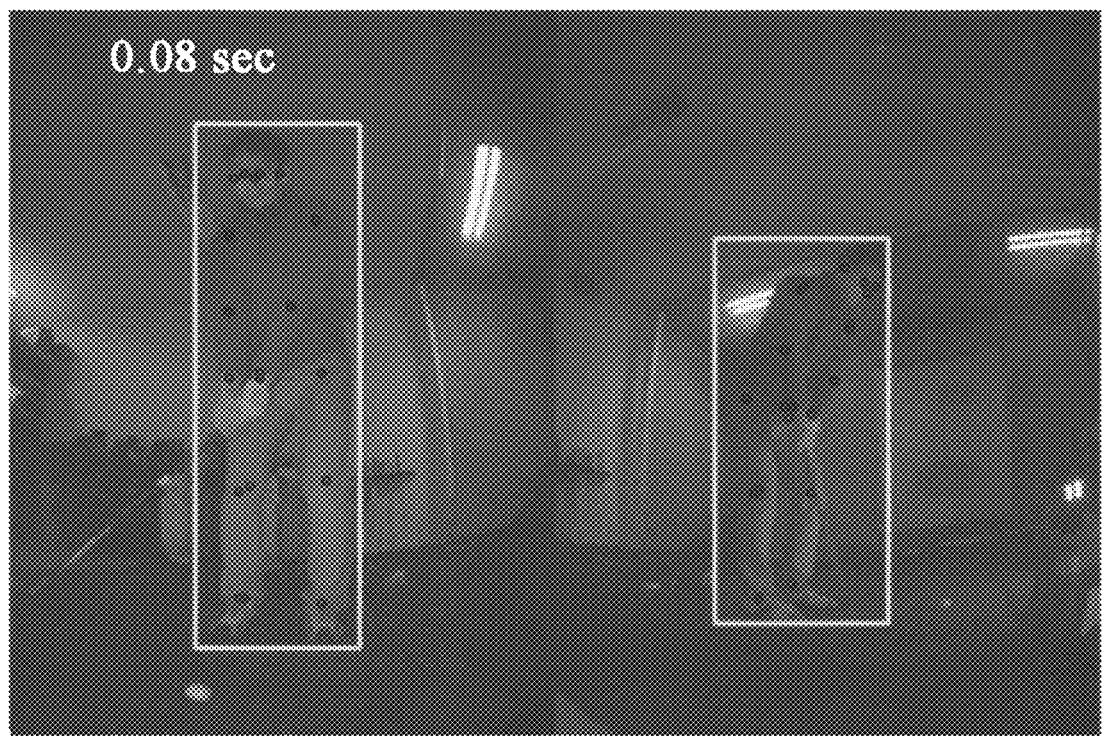

[FIG.6C]
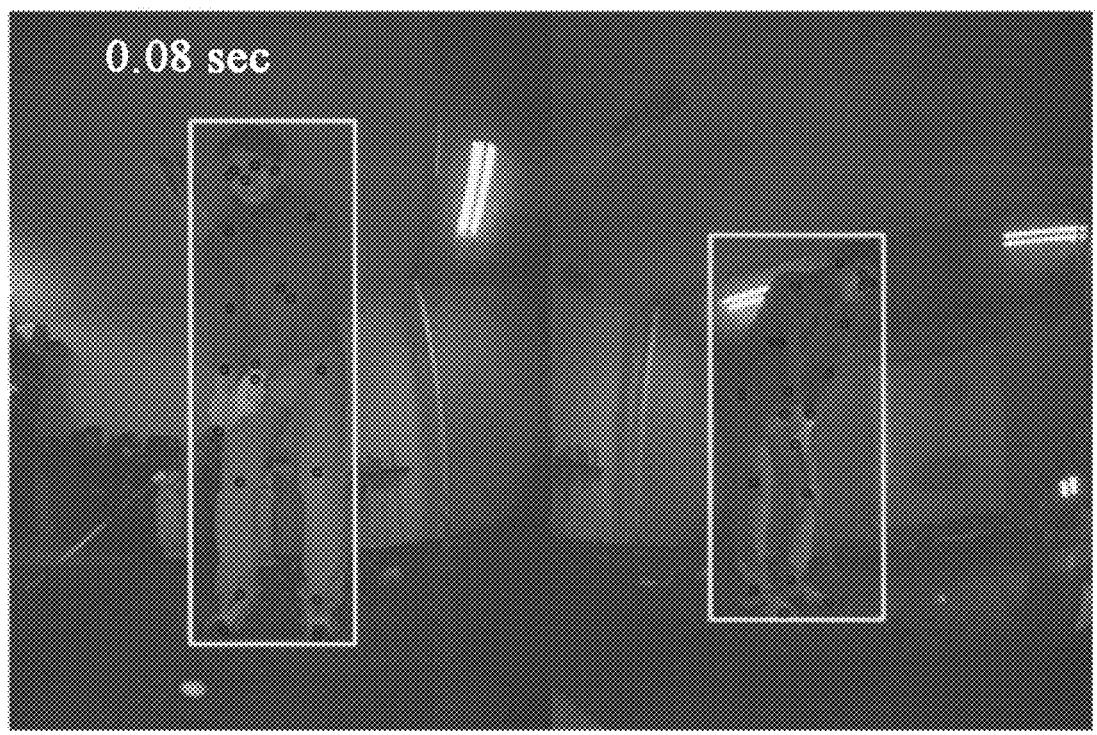

APPARATUS AND METHODS FOR PROVIDING PRECISE MOTION ESTIMATION LEARNING MODEL

CROSS-REFERENCE TO RELATED APPLICATIONS

This application claims the benefit under 35 USC 119(a) of Korean Patent Application No. 10-2021-0117636 filed on Sep. 3, 2021, in the Korean Intellectual Property Office, the entire disclosure of which is incorporated herein by reference for all purposes.

BACKGROUND

Field

The present disclosure relates to an apparatus and a method for providing a precise motion estimation learning model, and more particularly, to an apparatus and a method for providing a precise motion estimation learning model using an expanded key point based on a standard dataset.

Description of the Related Art

A supervised learning of the deep learning is one of machine learning to infer one function from training data and a large amount of data collection is required for a good performance. Further, in order to learn the collected data, a label for the data is necessary. Accordingly, a time and an effort are needed for the labeling to input the label. In order to reduce the time and the effort, a standard dataset which is created in advance for the machine learning is utilized.

As the standard dataset fora representative human motion estimation deep learning task, there are a common object in context (COCO) dataset and an MPII dataset. An annotation provided by the COCO dataset provides coordinate information for up to 17 key points and the MPII dataset provides 16 key point coordinate information. The deep learning model is trained in accordance with the maximum number of key points provided from each dataset. With respect to COCO dataset, SOTA has an accuracy of 77.4 mAP by Zhang et al. [1]. With respect to MPII dataset, SOTA has an accuracy of 94.1% by Bulat et al. [2].

To be more specific, the COCO dataset is a standardized large-scale photorealistic image dataset having annotations for object detection, image segmentation, image labeling, and key points. The COCO dataset allows many researchers and practitioners to train robust models using a stable dataset without performing a task requiring much time and efforts.

However, when such a standard dataset is used, there is an annotation dependent problem that the learning is performed only within the range of the annotation provided by the dataset. That is, there are annotation dependent problems that the model trained by the COCO dataset has no choice but to train a model which detects only a predetermined number and types of key points up to 17 at maximum and the MPII dataset has no choice but to train a model which detects only a predetermined number and types of key points up to 16 at maximum.

In the meantime, in order to precisely estimate a motion/pose of the human, a larger number of key points to be sensed is demanded. However, in order to increase the number of key points, there is a problem in that a pre-task which requires a lot of time to collect and process a large-scale data and annotation data suitable therefor is necessary.

SUMMARY

Accordingly, an object of the present disclosure is to provide a method and an apparatus for providing a precise motion estimation model by transfer learning of a standard dataset with a predetermined number of key points of the related art and an animation dataset which easily expands a key point.

In order to achieve the object, according to an aspect of the present disclosure, a precise motion estimation learning model providing apparatus includes: a database unit which stores a standard dataset labeled according to a first number of key points, an animation dataset labeled according to a second number of key points which is larger than the first number, and a photorealistic dataset having the second number of key points; a standard learning unit which learns the standard dataset for motion estimation to generate a standard learning model; an animation learning unit which retrains the animation dataset based on a weight of the standard learning model to generate an animation learning model; and a motion estimation learning unit which trains the photorealistic dataset based on the weight of the animation learning model to finely tune to generate a precise motion estimation learning model.

According to one exemplary embodiment, the number of photorealistic datasets is smaller than the number of the standard datasets and the animation datasets.

According to one exemplary embodiment, the animation learning unit and the motion estimation learning unit employ a mean square error method as the end-to-end learning method.

According to one exemplary embodiment, a weight of the standard learning model is used as an initial value of the animation learning model.

According to one exemplary embodiment, a weight of the animation learning model is used as an initial value of the motion estimation learning model.

A precise motion estimation learning model providing method of an operation estimation learning model providing apparatus according to the exemplary embodiment of the present disclosure includes: preparing a standard dataset labeled according to a first number of key points, an animation dataset labeled according to a second number of key points which is larger than the first number, and a photorealistic dataset having the second number of key points; learning the standard dataset for motion estimation to generate a standard learning model; retraining the animation dataset based on a weight of the standard learning model to generate an animation learning model; and training the photorealistic dataset based on the weight of the animation learning model to finely tune to generate a precise motion estimation learning model.

According to the exemplary embodiment of the present disclosure, animation data which easily expands a key point is used for the transfer learning based on a standard dataset to generate a motion estimation learning model having an expanded key point.

Further, it is expected to perform precise motion estimation suitable for a desired purpose using a number of key points desired by a user only with a small amount of photorealistic dataset.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a conceptual view for explaining a concept for a precise motion estimating method according to an exemplary embodiment of the present disclosure;

FIG. 2 is a block diagram schematically illustrating a configuration for explaining a precise motion estimation model providing apparatus according to an exemplary embodiment of the present disclosure;

FIG. 3 is a flowchart illustrating a precise motion estimation model providing method according to an exemplary embodiment of the present disclosure;

FIGS. 4A and 4B are views for explaining a verification experiment result of an effect of a transfer learning of a motion estimation learning model according to an exemplary embodiment of the present disclosure;

FIG. 5 is a graph showing a comparison result of a fine-tuning performance for a photo-realistic data usage ratio in a domain adaption step according to an exemplary embodiment of the present disclosure; and FIGS. 6A, 6B, and 6C are views illustrating an example of inference of a motion learning model according to an exemplary embodiment of the present disclosure.

DETAILED DESCRIPTION OF THE EMBODIMENT

Hereinafter, exemplary embodiments of the present disclosure will be described with reference to accompanying drawings to allow those skilled in the art to easily carry out the present disclosure. However, the present disclosure can be realized in various different forms, and is not limited to the exemplary embodiments described herein. In the meantime, in order to clearly describe the present disclosure, parts not related to the description will be omitted. Like reference numerals designate like elements throughout the specification. Further, description of parts that can be easily understood by those skilled in the art even though detailed description thereof is omitted will be omitted.

In the specification and the claim, unless explicitly described to the contrary, the word "comprise" and variations such as "comprises" or "comprising", will be understood to imply the inclusion of stated elements but not the exclusion of any other elements.

FIG. 1 is a conceptual view for explaining a concept for a precise motion estimating method according to an exemplary embodiment of the present disclosure and FIG. 2 is a block diagram schematically illustrating a configuration for explaining a precise motion estimation model providing apparatus according to an exemplary embodiment of the present disclosure.

In a deep learning technique which estimates a motion and a pose of a human, the more the number of key points, the more the precise estimation is possible.

However, the standard dataset has a limited number of key points so that it is not possible to expand the key points and it takes a lot of time and costs to collect and process a large scale photorealistic dataset having a larger number of key points.

Accordingly, according to the exemplary embodiment of the present disclosure, an animation dataset which is easily generated based on a standard dataset is used for transfer learning to generate a motion estimation learning model having an expanded number of key points.

In order to generate a motion estimation learning model having an expanded number of key points, a larger number of key points is first required to precisely estimate a pose of the human. Therefore, a task modifying step is performed to generate a learning model having a desired number of key points, that is, an expanded number of key points using animation data which is easily generated.

Next, a domain adaption step for finely tuning the model trained by the animation data having the increased key points to apply to the photorealistic data is performed to generate a learning model to precisely estimate a motion. According to the exemplary embodiment of the present disclosure, the learning according to the motion estimation learning model based on the animation data and the photorealistic data is referred to as two-stage transfer learning.

In FIG. 1, standard data is denoted by a source domain Ds and animation data and photorealistic data are denoted by target domains $T_1$ and $T_2$, respectively. Similarly, tasks labeled for domains are denoted by $T_S$, $T_{T1}$, and $T_{T2}$, respectively. A learning model using a standard dataset, a learning model using an animation dataset, and a learning model using a photorealistic dataset are denoted by $f_S$, $f_{T1}$, and $f_{T2}$, respectively. All the learning is performed by an end-to-end learning manner.

Referring to FIG. 2, the precise motion estimation learning model providing apparatus 100 may include a database unit 110, a standard learning unit 120, an animation learning unit 130, and a motion estimation learning unit 140.

The database unit 110 may store information and a program code required to generate an operation estimation learning model.

In an exemplary embodiment, the database unit 110 may store a standard dataset labeled according to a first number of key points, an animation dataset labeled according to a second number of key points which is larger than the first number, and a photorealistic dataset having the second number of key points.

The standard dataset and the animation dataset are large-scale datasets and the number of photorealistic datasets may be smaller than the number of standard datasets and animation datasets. The large scale datasets may be tens of thousands of datasets and the small amount may be several thousand, but is not limited thereto.

Further, the database unit 110 may store the standard learning model, the animation learning model, and the motion estimation learning model.

Further, the database unit 110 may store labeled tasks for the learning of the standard learning model, the animation learning model, and the motion estimation learning model.

The standard learning unit 120 learns the standard dataset for motion estimation to generate a standard learning model. If necessary, the standard learning model may be stored in advance.

The animation learning unit 130 re-trains the animation dataset based on a weight of the standard learning model to generate an animation learning model.

In an exemplary embodiment, the animation learning unit 130 applies a weight of the standard learning model to the collected animation data and performs the supervised learning based on the labeled animation task which is a key.

The motion estimation learning unit 140 trains the photorealistic dataset based on a weight of the animation learning model which is retrained and generated by the animation learning unit 130 to be finely tuned to generate a precise motion estimation learning model.

In an exemplary embodiment, the motion estimation learning unit 140 performs the supervised learning on the labeled photorealistic dataset to the collected photorealistic data with a weight of the animation learning model as an initial value to generate a motion estimation learning model. A trained finely-tuned weight is included.

A specific operation method of a motion estimation learning model providing apparatus of FIG. 2 will be described below with reference to FIGS. 3 to 6C.

FIG. 3 is a flowchart illustrating a precise motion estimation model providing method according to an exemplary embodiment of the present disclosure.

First, in step S110, standard data, animation data, and photorealistic data are prepared and labeled. Labeling data for the standard data may be stored in advance.

The standard data is labeled with a predetermined first number of key points.

The animation data is labeled with a second number of key points more than the standard data. The larger the second number of key points may be referred to as expanded key points.

The photorealistic dataset is labeled with the second number of key points which is equal to the number of animation datasets.

Even though a large number of standard datasets and a large number of animation datasets are demanded, a small number of photorealistic datasets may be demanded.

The standard data, the animation data, and the photorealistic data are labeled according to a predetermined number of key points. For example, each of standard data of the standard dataset has 17 key points for COCO (common object in context) and has 16 key points for the MPII dataset. In the meantime, each of the animation data of the animation dataset may have a larger number of key points than that of the standard dataset. For example, the animation data may have 21 key points. The photorealistic data of the photorealistic dataset has key points which are more than that of the standard dataset and equal to that of the animation dataset. For example, the photorealistic data may have 21 key points. However, the number of key points is just an example, but is not limited thereto.

In step S120, the learning is performed using the standard data and a labeled task to generate a standard learning model having a first weight. That is, the standard learning model is trained to have a first number of key points. When the standard learning model is prepared in advance, the step S120 may be omitted.

In step S130, a task of the standard data is modified to a task of the animation data. To be more specific, the animation data and the task of the labeled animation data are trained to generate an animation learning model having a second weight.

At this time, a first weight of the standard learning model is loaded to be set as an initial value and supervised learning is performed by referring to the task of the labeled animation data to deduce a second weight.

As described above, a task of the standard data is modified to a task of the animation data to train to have an expanded number (second number) of key points.

In step S140, a domain of the animation data is adapted with a domain of the photorealistic data. To be more specific, the learning is performed based on the photorealistic data and the labeled photorealistic data task to generate a motion estimation learning model having a third weight.

At this time, the fine-tuning is performed by loading a second weight of the animation learning model to be set as an initial value to perform the fine tuning. The motion estimation learning employs the mean squared error method as an end-to-end learning method. Further, an error for the key point label is minimized by a mean squared error (MSE) loss function.

The animation data is relatively easily generated so that a larger number of animation datasets as many as the number of standard datasets may be prepared. In contrast, only a small amount of photorealistic dataset which is not easily collected is prepared. That is, a very small number of photorealistic datasets may be prepared as compared with the standard datasets or the animation datasets.

Even though the number of key points of the standard dataset is not easily changed by the user, the animation data is easily generated so that the animation data may be labeled using a number of key points desired by the user. Accordingly, a large number of photorealistic datasets which are difficult to be collected is not prepared and trained, but a learning model having a desired number of key points is generated using a large amount of animation data and then the animation data and the photorealistic data are finely tuned using a small amount of photorealistic data to acquire a motion estimation learning model having a desired number of key points.

FIGS. 4A and 4B are views for explaining a verification experiment result of an effect of a transfer learning of a motion estimation learning model according to an exemplary embodiment of the present disclosure.

According to an exemplary embodiment of the present disclosure, for a verification experiment of the effect of the transfer learning, a photorealistic dataset for a golf swing including a total of 3,424 samples and an animation dataset for a golf swing including a total of 27,478 samples were obtained. As a frame model structure used for the learning, high-resolution representation (HR) Net-w32 was used. Learning data and evaluation data were divided with a ratio of 7:3 and as an accuracy evaluation method, a method of calculating an object key point similarity (OKS) to compare in the unit of an average precision (AP) with 0.5:0.05:0.95 was employed. A standard deviation for the expanded key points was unified as 0.89 which is the same as a standard deviation for the ankle.

Referring to FIG. 4A, FIG. 4A is a graph of an experiment result obtained by measuring an accuracy for a result of a learning for each of datasets of FIG. 1.

As seen from FIG. 4A, a model trained with the photorealistic golf swing data showed an accuracy of 94 mAP for evaluation data for the photorealistic golf swing data and showed an accuracy of 1.5 mAP for the animation data.

As seen from FIG. 4B, the model trained with the animation golf swing data showed a high accuracy of 99.9 mAP for the evaluation data, but the accuracy for the photorealistic golf swing data was 42.2 mAP. As described above, it may be confirmed that from the result obtained by learning with the animation golf swing dataset, a sufficient accuracy for the photorealistic dataset is not ensured.

FIG. 5 is a graph illustrating a comparison result of a fine-tuning performance for a photo-realistic data usage ratio in a domain adaption step according to an exemplary embodiment of the present disclosure.

FIG. 5 illustrates a result of comparing a case that two-step fine tuning is performed using animation data when only four samples, among a total of 3,424 sample data are used and a case that the animation data is not used.

FIG. 5 is a graph for comparing performances for photorealistic evaluation data after transfer learning while changing a ratio of the learning data of the photorealistic data from 0.1% to 30% of the entire samples in the exemplary embodiment of the present disclosure.

In FIG. 5, a green graph illustrates an accuracy of the result of training the photorealistic data using only the standard learning model that has learned the standard data set CoCo and a gray graph illustrates an accuracy of the result of performing two-stage transfer learning using the standard data set and the animation data. The black data is a result obtained by measuring an accuracy for 17 key points for the photorealistic dataset with a model which is trained in advance with the standard dataset. When two-step transfer learning is performed, the larger the number of samples used to train the photorealistic golf data, the better the performance. A high level of accuracy of 88.3 mAP is shown with only four samples.

When the two-step fine tuning was performed using the animation data, the performance was improved by 29% as compared with case that the animation data is not used. The difference is just 6.1% from the accuracy when scratch learning of the photorealistic data is performed.

FIGS. 6A, 6B, and 6C are views illustrating an example of inference of a motion learning model according to an exemplary embodiment of the present disclosure.

FIGS. 6A, 6B, and 6C are an inference example of a model as a result of finely tuning the photorealistic data with a ratio of 0.1% in which FIG. 6A is an actual inference example of a model of learning a photorealistic golf swing data scratch, FIG. 6B is an inference example of a model of transfer learning with a photorealistic golf swing data to the standard data model without having an animation learning model, and FIG. 6C is an inference result of a motion inference learning model according to an exemplary embodiment of the present disclosure, that is, a two-stage transfer learning.

It is understood that in FIG. 6B, key points for the foot, the hand, and a body center portion are inaccurately set. It is understood that FIGS. 6B and 6C show an inference result in a similar position with respect to the overall key points.

As seen from the above-description, according to the exemplary embodiment of the present disclosure, animation data which easily expands key points is used for the transfer learning based on a standard dataset to generate a motion estimation learning model having expanded key points.

Further, it is expected to perform precise motion estimation suitable for a desired purpose using a number of key points desired by a user only with a small amount of photorealistic dataset.

In the above-described exemplary system, although the methods have been described based on a flowchart as a series of steps of blocks, the present disclosure is not limited to the order of the steps and some step may be generated in a different order from the above-described step or simultaneously.

Further, those skilled in the art may appreciate that the steps shown in the flowchart is not exclusive, but another step may be included and one or more steps of the flowchart may be omitted without affecting the scope of the present disclosure.

What is claimed is:

1. A precise motion estimation learning model providing apparatus, comprising:
    a database unit which stores a standard dataset labeled according to a first number of key points, an animation dataset labeled according to a second number of key points which is larger than the first number, and a photorealistic dataset having the second number of key points;
    a standard learning unit which learns the standard dataset for motion estimation to generate a standard learning model;
    an animation learning unit which retrains the animation dataset based on a weight of the standard learning model to generate an animation learning model; and
    a motion estimation learning unit which trains the photorealistic dataset based on the weight of the animation learning model to finely tune to generate a precise motion estimation learning model.

2. The motion estimation learning model providing apparatus according to claim 1, wherein the number of photorealistic datasets is smaller than the number of the standard datasets and the animation datasets.

3. The motion estimation learning model providing apparatus according to claim 1, wherein the animation learning unit and the motion estimation learning unit employ a mean square error method as the end-to-end learning method.

4. The motion estimation learning model providing apparatus according to claim 1, wherein a weight of the standard learning model is used as an initial value of the animation learning model.

5. The motion estimation learning model providing apparatus according to claim 1, wherein a weight of the animation learning model is used as an initial value of the motion estimation learning model.

6. A precise motion estimation learning model providing method of a motion estimation learning model providing apparatus, comprising:
    preparing a standard dataset labeled according to a first number of key points, an animation dataset labeled according to a second number of key points which is larger than the first number, and a photorealistic dataset having the second number of key points;
    learning the standard dataset for motion estimation to generate a standard learning model;
    retraining the animation dataset based on a weight of the standard learning model to generate an animation learning model; and
    training the photorealistic dataset based on the weight of the animation learning model to finely tune to generate a precise motion estimation learning model.

7. The motion estimation learning model providing method according to claim 6, wherein the number of photorealistic datasets is smaller than the number of the standard datasets and the animation datasets.

8. The motion estimation learning model providing method according to claim 6, wherein the generating of an animation learning model and the generating of the motion estimation learning unit employ a mean square error method as the end-to-end learning method.

9. The motion estimation learning model providing method according to claim 6, wherein a weight of the standard learning model is used as an initial value of the animation learning model.

10. The motion estimation learning model providing method according to claim 6, wherein a weight of the animation learning model is used as an initial value of the motion estimation learning model.

* * * * *